US009436699B2

(12) United States Patent
Haubold et al.

(10) Patent No.: US 9,436,699 B2
(45) Date of Patent: Sep. 6, 2016

(54) TECHNIQUES FOR EFFICIENT FILE OPERATIONS

(75) Inventors: Jeremy Haubold, Portage, IN (US); Claudio Ariel Pacciarini, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 114 days.

(21) Appl. No.: 13/230,308

(22) Filed: Sep. 12, 2011

(65) Prior Publication Data

US 2013/0066835 A1    Mar. 14, 2013

(51) Int. Cl.
*G06F 17/30* (2006.01)
*G06F 9/445* (2006.01)

(52) U.S. Cl.
CPC ........... *G06F 17/30171* (2013.01); *G06F 8/61* (2013.01)

(58) Field of Classification Search
CPC ........................................................ G06F 9/04
USPC ........................................................ 707/692
See application file for complete search history.

(56) References Cited

U.S. PATENT DOCUMENTS

| 6,986,132 | B1* | 1/2006 | Schwabe | 717/168 |
|---|---|---|---|---|
| 2001/0032311 | A1* | 10/2001 | White | 713/168 |
| 2005/0044092 | A1 | 2/2005 | Adya et al. | |
| 2008/0043272 | A1* | 2/2008 | Berg | 358/1.13 |
| 2008/0097996 | A1* | 4/2008 | Dias | G06F 17/30377 |
| 2009/0198665 | A1* | 8/2009 | Chappuis | 707/4 |
| 2009/0307276 | A1* | 12/2009 | Dolan et al. | 707/202 |
| 2012/0102004 | A1* | 4/2012 | Johnson et al. | 707/692 |

OTHER PUBLICATIONS

Prabhakaran, et al., "Transactional Flash", Retrieved at <<http://www.usenix.org/event/osdi08/tech/full_papers/prabhakaran/prabhakaran.pdf>>, 8th USENIX Symposium on Operating Systems Design and Implementation, Dec. 10, 2008, pp. 147-160.
Porter, et al., "Operating System Transactions", Retrieved at <<http://citeseerx.ist.psu.edu/viewdoc/download?doi=10.1.1.149.1203&rep=rep1&type=pdf>>, Symposium on Operating Systems Principles, Oct. 14, 2009, pp. 161-176.
Chen, et al., "Rio: Storing Files Reliably in Memory", Retrieved at <<http://citeseerx.ist.psu.edu/viewdoc/download?doi=10.1.1.92.3747&rep=rep1&type=pdf>>, 1995, 9 Pages.

(Continued)

*Primary Examiner* — Hosain Alam
*Assistant Examiner* — Tuan-Khanh Phan
(74) *Attorney, Agent, or Firm* — Bryan Webster; Judy Yee; Micky Minhas

(57) ABSTRACT

Various technologies described herein pertain to performing a file operation on an inputted file on a computer system. File data retained at a first location in a data store and a first file name retained at a second location in the data store can be provided. The inputted file can include the file data. Moreover, the first file name is a hard link to the file data. Further, a file operation command related to the file data can be received during installation or removal of the inputted file. Accordingly, a second file name retained at a third location in the data store can be created in response to the file operation command. The second file name is created while the file data is immutably maintained at the first location in the data store. Further, the second file name is a hard link to the file data.

20 Claims, 6 Drawing Sheets

(56) References Cited

OTHER PUBLICATIONS

Kallahalla, et al., "Plutus: Scalable Secure File Sharing on Untrusted Storage", Retrieved at <<http://www.hpl.hp.com/research/ssp/papers/FAST2003-plutus.pdf>>, Proceedings of the 2nd Conference on File and Storage Technologies, Apr. 2, 2003, pp. 29-42.

"BackupPC Documentation", Retrieved at <<http://backuppc.sourceforge.net/faq/BackupPChtml>>, Retrieved Date: Sep. 9, 2011, 72 Pages.

"Storing User-Specific Information", Retrieved at <<http://msdn.microsoft.com/en-us/library/aa383452.aspx>>, Retrieved Date: Sep. 9, 2011, 1 Page.

* cited by examiner

TECHNIQUES FOR EFFICIENT FILE OPERATIONS

BACKGROUND

A typical installer oftentimes performs conventional file operations to install and remove a file on a computer system. For instance, a file can be included in a package being installed or removed on a computer system. Examples of conventional file operations typically performed by a common installer include copying a file, moving a file, deleting a file, and so forth. These conventional file operations employed by an installer, however, can be expensive in terms of processor utilization, amount of information transferred (e.g., input/output (I/O)), memory consumption, and so forth. Moreover, the conventional file operations can be time consuming, particularly as file sizes increase.

According to an example, conventionally when a file is copied during installation or removal, file data is read from a source file and written to a destination file. Yet, reading, writing, and duplicating the file data when the file is copied can be time consuming and can inefficiently employ computing resources. Moreover, the amount of overhead associated with a typical installer performing such conventional file operations can become more significant as sizes of files and/or number of files upon which the conventional file operations are performed increases.

SUMMARY

Described herein are various technologies that pertain to using hard links to perform a file operation during software installation or removal. The file operation can be performed while file data is immutably maintained. File data retained at a first location in a data store that is accessible by a processor of a computer system can be provided. Further, a first file name retained at a second location in the data store can be provided. The first file name is a hard link to the file data. Moreover, a file operation command, such as a move command or a copy command, related to the file data can be received. In response to the file operation command, a second file name retained at a third location in the data store can be created while the file data is immutably maintained at the first location in the data store. Further, the second file name is a hard link to the file data.

According to various embodiments described herein, the file operation command can be a copy command. In response to the copy command, the second file name can be created in the data store and the first file name can be maintained in the data store while the file data is locked. Thus, the copy command can be performed while the file data remains locked, and without the file data being copied. In accordance with other embodiments set forth herein, the file operation command can be a move command. Hence, in response to the move command, the second file name can be created in the data store and the first file name can be deleted from the data store while the file data is locked. Accordingly, the move command can be performed while the file data remains locked, and without the file data being moved. Creating and/or deleting file names that point to the file data, while the file data remains unmodifiable, can allow for more efficiently performing file operations as compared to conventional file operations where data is read, written, duplicated, and so forth.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
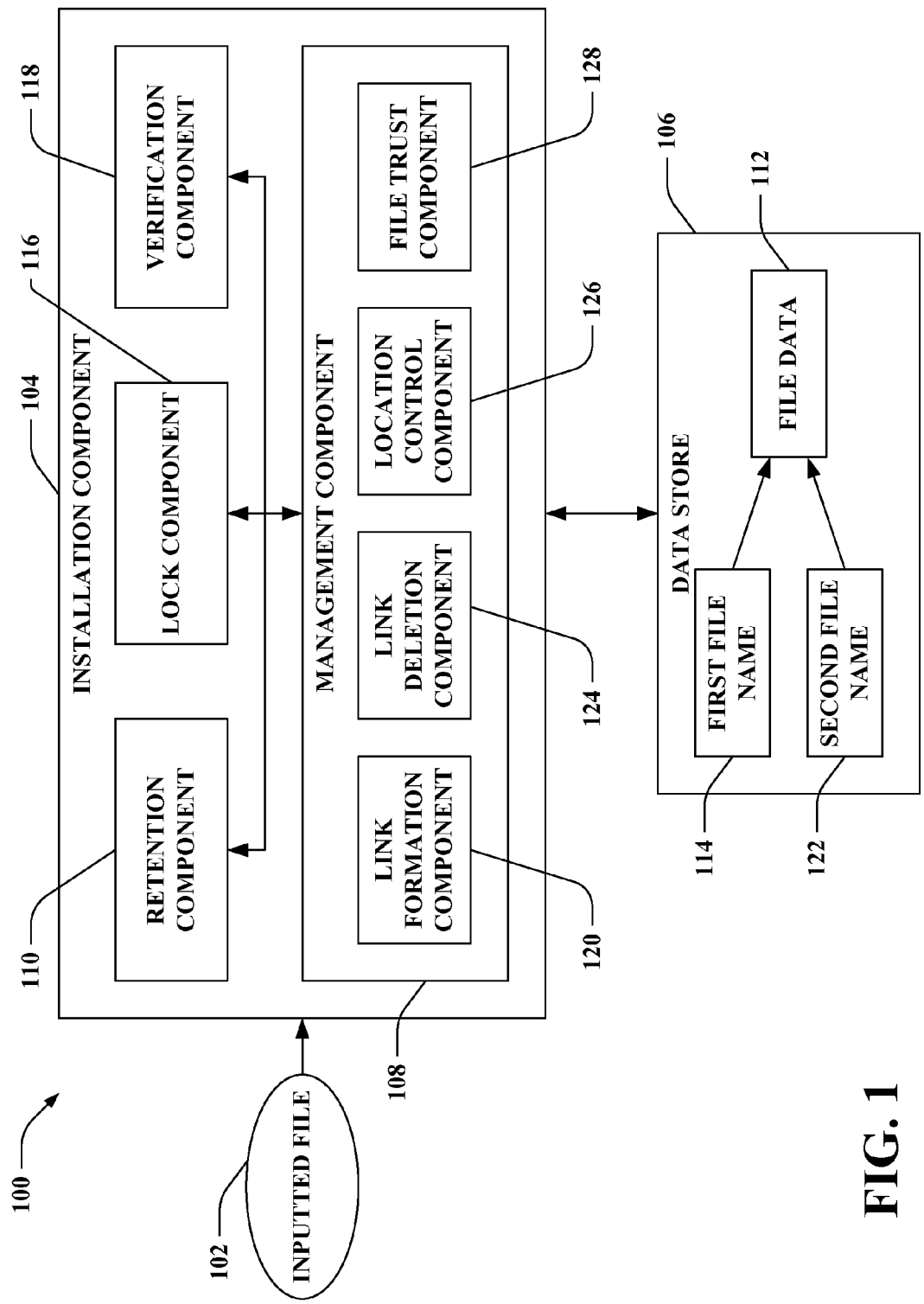
FIG. 1 illustrates a functional block diagram of an exemplary system that installs and/or removes an inputted file on a computer system.

Various technologies pertaining to performing file operations where file data is immutably maintained during software installation or removal are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, file data can be immutably maintained when performing various file operations (e.g., copy, move, delete, etc.) during software installation. The file data can remain unmodifiable while hard links to the file data are created and/or deleted to accomplish the file operations. Accordingly, an amount of data to be copied, moved, and/or verified on disk can be significantly reduced by simulating file copies, file moves, and so forth using hard links without moving the file data. Thus, the file operations utilized during an installation described herein can be more efficient in terms of processor utilization, I/O, memory consumption, etc. as compared to conventional file operations commonly employed during an installation. Moreover, installation speeds can be increased by utilizing the file operations where the file data is immutably maintained as described herein.

Referring now to the drawings, FIG. 1 illustrates a system 100 that installs an inputted file 102 on a computer system. The system 100 includes an installation component 104 that can receive the inputted file 102 and setup the inputted file 102 on a data store 106, which is accessible by a processor of the computer system. For instance, the installation component 104 can install, maintain, and remove the inputted file 102 on the data store 106.

It is contemplated that the inputted file 102 can be substantially any type of file. According to an example, the inputted file 102 can be included in an installation package. Additionally or alternatively, the inputted file 102 can be a compressed file. Moreover, it is to be appreciated that the inputted file 102 can be from substantially any source. By way of example, the inputted file 102 can be downloaded from a specific Uniform Resource Locator (URL), transferred from a coupled computer-readable storage medium, or the like. While the inputted file 102 is described herein as being received by the installation component 104, it is to be further appreciated that substantially any number of inputted files similar to the inputted file 102 can be received by the installation component 104 and similarly installed as set forth herein in greater detail.

The installation component 104 includes a management component 108 that performs various file operations on the inputted file 102 as part of the installation. The management component 108 can receive a file operation command as part of the installation of the inputted file 102. Moreover, the management component 108 can create and/or delete hard link(s) in response to the file operation command.

The inputted file 102 includes file data 112. The installation component 104 further includes a retention component 110 that can write the file data 112 from the inputted file 102 to a first location in the data store 106. According to an example, the inputted file 102 can be a compressed file, and the retention component 110 can extract the file data 112 from the compressed file to the first location in the data store 106. According to an example, the retention component 110 can create a temporary directory that need not require elevation. Following this example, the directory can be used by the retention component 110 to run data extraction code that can be executed with restrictive privileges. However, it is to be appreciated that the claimed subject matter is not limited to the foregoing example. Moreover, the retention component 110 can create a first file name 114 at a second location in the data store 106, where the first file name 114 is a hard link to the file data 112. A hard link is a directory entry for file data on a file system. Accordingly, the first file name 114 is a first directory entry for the file data 112 on a file system of the data store 106.

The installation component 104 can also include a lock component 116 and a verification component 118. The lock component 116 can lock the file data 112 retained at the first location in the data store 106. When locked, the file data 112 is immutable. Moreover, the verification component 118 can verify the file data 112 as locked at the first location in the data store 106. When verifying the file data 112, the verification component 118 can generate verification result information. For example, the verification component 118 can verify the file data 112 by calculating a hash value based on the file data 112 (e.g., contents of a file) or checking a digital signature of the file data 112. When the file data 112 is successfully verified by the verification component 118, installation can continue. Alternatively, if an error is detected by the verification component 118, then installation performed by the installation component 104 can be aborted, for example. Pursuant to another example, if an error is detected by the verification component 118, then the inputted file 102 can be obtained again (e.g., automatically re-download the inputted file 102, prompt a user to again supply the inputted file 102, etc.).

While the file data 112 is immutably maintained at the first location in the data store 106 by the lock component 116, the management component 108 can receive a file operation command related to the file data 112. The file operation command can be part of installing the inputted file 102. For example, the file operation command can be included in an installation script (e.g., received with the inputted file 102, generated by the installation component 104, etc.); however, the claimed subject matter is not so limited. Further, the management component 108 can perform the file operation command while the file data remains locked (e.g., by the lock component 116).

The management component 108 can include a link formation component 120 that can create a second file name 122 retained at a third location in the data store 106 in response to the file operation command while the file data 112 is immutably maintained at the first location in the data store 106. The second file name 122 is a hard link to the file data 112. Hence, the second file name 122 is a second directory entry for the file data 112 on the file system of the data store 106. Examples of the file operation command that can cause the link formation component 120 to create the second file name 122 include a copy command, a move command, and so forth. It is also contemplated that the link formation component 120 can create substantially any number of file names that point to the file data 112.

By way of example, the link formation component 120 can create the second file name 122 retained at the third location in the data store 106 in response to a copy command. Following this example, the first file name 114 retained at the second location in the data store 106 can be maintained in response to the copy command. Thus, after the copy command, both the first file name 114 and the second file name 122 can point to the file data 112.

The second file name 122 can be created by the link formation component 120 without moving, copying, modifying, etc. the file data 112. The file data 112 can be immutably maintained at the first location in the data store 106 by the lock component 116 without being moved and without being copied when the second file name 122 retained at the third location in the data store 106 is created by the link formation component 120 in response to the file operation command. Accordingly, instead of moving or copying the file data 112, which commonly occurs when conventional file operations (e.g., copying a file, moving a file, etc.) are performed during installation or removal, the second file name 122 can be created by the link formation component 120. Thus, irrespective of a size of the file data 112, the second file name 122 can quickly and inexpensively (e.g., in terms of resource utilization) be generated by the link formation component 120 in response to the file operation command.

The management component 108 also includes a link deletion component 124 that can delete a file name that points to the file data 112 in response to a file operation command. The link deletion component 124 can dissociate a file name from the file data 112 without destroying the file data 112. For instance, the file data 112 can still be accessible if at least one disparate file name that points to the file data 112 remains (e.g., if the second file name 122 continues to point to the file data 112 after the link deletion component 124 deletes the first file name 114, etc.). Moreover, if the deletion component 124 removes a last remaining file name associated with the file data 112, then the space at the first location in the data store 106 can be considered to be free. Pursuant to an example, the link deletion component 124 can defer deleting a file name (e.g., while the file data 112 is locked by the lock component 116, until termination of installation, etc.); yet, it is to be appreciated that the claimed subject matter is not so limited.

According to an example, the second file name 122 (e.g., associated with the file data 112) retained at the third location in the data store 106 can be created by the link formation component 120 in response to a move command. Following this example, the link deletion component 124 can delete the first file name 114 (e.g., associated with the file data 112) retained at the second location in the data store 106 in response to the move command. For instance, the link deletion component 124 can delete the first file name 114 after the link formation component 120 creates the second file name 122 (e.g., deletion of the first file name 114 can be deferred by the link deletion component 124, deletion of the first file name 114 by the link deletion component 124 can occur upon the second file name 122 being created by the link formation component 120, etc.); however, the claimed subject matter is not so limited.

In accordance with another example, the management component 108 can receive a delete command (e.g., a disparate file operation command) related to the file data 112. In response to the delete command, the link deletion component 124 can delete a file name (e.g., a file name specified by the delete command). According to an illustration, if the first file name 114 and the second file name 122 both point to the file data 112, then the first file name 114 and/or the second file name 122 (e.g., as specified by the delete command) can be deleted by the link deletion component 124 in response to the delete command. By way of yet another illustration, if one file name points to the file data 112 (e.g., the first file name 114 or the second file name 122), then the link deletion component 124 can delete that file name in response to the delete command. It is to be appreciated, however, that the claimed subject matter is not limited to the foregoing illustrations as it is contemplated that the file data 112 can be associated with substantially any number of file names similar to the first file name 114 and the second file name 122.

According to a further example, the link deletion component 124 can defer deletion of a file name for a deferral period of time (e.g., when the file name is to be deleted but is unable to be deleted at the time of receiving a delete command, etc.). The deferral period of time can be a time period during which the file data 112 is locked by the lock component 116, a time period during which the file name being deleted by the link deletion component 124 is in use, a time period during which the inputted file 102 is being installed or removed, or the like. Moreover, the link deletion component 124 can delete the file name after the deferral period of time (e.g., when a program that locks, uses, installs, etc. the file data 112 and/or the inputted file 102 terminates).

Moreover, the management component 108 can include a location control component 126 that manages a location in the data store 106 at which a file name is created (e.g., by the retention component 110, by the link formation component 120, etc.) and/or a location in the data store 106 at which file data is written. The location control component 126 can specify a location in the data store 106 at which a file name is created and/or a location in the data store 106 at which file data is written.

According to an example, the location control component 126 can specify that the first file name 114 be retained at the second location in the data store 106, which can be a temporary location. For instance, the location control component 126 can manage the retention component 110 to place the inputted file 102 (and disparate inputted file(s) (not shown)) received by the installation component 104 in the temporary location; hence, the first file name 114 can be stored in the temporary location. Further, it is contemplated that the file data 112 can be stored in the temporary location (e.g., the first location can be the second location) or substantially any other location in the data store 106 (e.g., the first location and the second location can differ). The temporary location can be set by a user, for example; however, the claimed subject matter is not so limited. Thereafter, when needed (e.g., when a move command or a copy command is received by the management component 108), the location control component 126 can generate a request for elevated access to resources (e.g., ask for elevation). The location control component 126 can receive a response that grants the elevated access to the resources. Based thereupon, the location control component 126 can enable the link formation component 120 to create the second file name 122 retained at the third location in the data store 106, where the third location in the data store 106 is a restricted location. Accordingly, the inputted file 102 (and the disparate inputted file(s)) can be moved to the restricted location almost instantaneously by creating (and/or deleting) hard link(s) while keeping the file data 112 locked (e.g., by the lock component 116).

The management component 108 can further include a file trust component 128. The file trust component 128 can control the lock component 116 to continue to lock the file data 112 at the first location in the data store 106 during installation or removal of the inputted file 102. For example, the file trust component 128 can control the lock component 116 to continue to lock the file data 112 when the second file name 122 is created by the link formation component 120 in response to the file operation command. According to another example, it is contemplated that the file trust component 128 can control the lock component 116 to continue to lock the file data 112 until installation or removal terminates. Yet, it is to be appreciated that the claimed subject matter is not limited to the aforementioned examples.

Moreover, the file trust component 128 can cache verification result information generated from verifying the file data 112 at the first location in the data store 106. The verification result information can be generated by the verification component 118 when the lock component 116 locks the file data 112 at the first location in the data store 106. The verification result information can be cached by the file trust component 128 while the file data 112 remains locked by the lock component 116. Further, the verification result information can be discarded by the file trust component 128 when the file data 112 is unlocked by the lock component 116.

Moreover, the file trust component 128 (and/or the verification component 118) can verify the file data 112 based on the verification result information as cached while the file data 112 remains locked. In accordance with an example, the file data 112 can be verified based on the verification result information in response to the file operation command that causes the second file name 122 to be created by the link formation component 120. Hence, the file trust component 128 can provide file trust caching based on file locking and file verification. Further, the verification result information can be cached in order to deliver nearly instantaneous results for subsequent verification calls (e.g., performed by the file trust component 128 and/or the verification component 118) for as long as the file data 112 is locked by the lock component 116.

Caching the verification result information allows for reducing an amount of data that is verified on disk during an installation. For instance, the file data 112 can be verified once during an installation of the inputted file 102. Since multiple setup components typically lock and verify files during an installation, keeping the file data 112 locked (e.g., unmodifiable) and caching the verification result information for as long as the file data 112 remains locked as provided in the system 100 allows for the file data 112 to be verified once. Further, subsequent requests to verify the file data 112 can utilize the cached verification result information and can return results nearly instantaneously. In contrast, when employing a conventional file operation, a file is typically locked and verified subsequent to a move or copy; thus, a file is oftentimes verified at least twice when using conventional approaches.

According to another example, a file operation can be rolled back by the management component 108. For instance, if the link formation component 120 creates the second file name 122 at the third location in the data store 106 in response to a file operation command, then that file operation command can be rolled back by deleting the second file name 122 retained at the third location in the data store 106.

It is further contemplated that the installation component 104 can install, commit, or rollback multiple files and file operations in parallel as an atomic transaction using kernel transactions. An atomic transaction can be a series of operations that either all occur or nothing occurs. By way of illustration, a plurality of file operation commands can be rolled back in parallel as an atomic transaction. According to various examples, the file data 112 and disparate file data can be installed in parallel as an atomic transaction, the file data 112 and disparate file data can be committed in parallel as an atomic transaction, the file data 112 and the disparate file data can be rolled back in parallel as an atomic transaction, or the like.

As set forth herein, when source and destination files are the same and need not be modified, a new pointer (e.g., hard link, file name, etc.) to the source file data can be created as a target file instead of performing a file copy. The new pointer to the file data can be created quickly, irrespective of file size.

Further, as noted above, conventional file operations employed as part of installation or removal are oftentimes computationally expensive. The following sets forth an example of conventional file operations employed as part of an installation. A file can be extracted to a temporary directory. Thereafter, the file can be locked and verified. Then, when a conventional copy or move is being performed to move the file to another location (e.g., final, intended location), then elevation can be requested. Depending on the situation, the file may be copied or moved to the other location. Thereafter, the destination file is again locked and verified, and then the temporary file can be deleted. As noted in the above example, the file typically is copied or moved at least once, and locked and verified at least twice when performing a conventional file operation. While the overhead expended to copy or move the data, as well as perform at least one additional round of locking and verifying the file, in conventional approaches may be small when dealing with a few small files, such overhead can become more significant when working with a bigger number of larger files.

Figure 2:
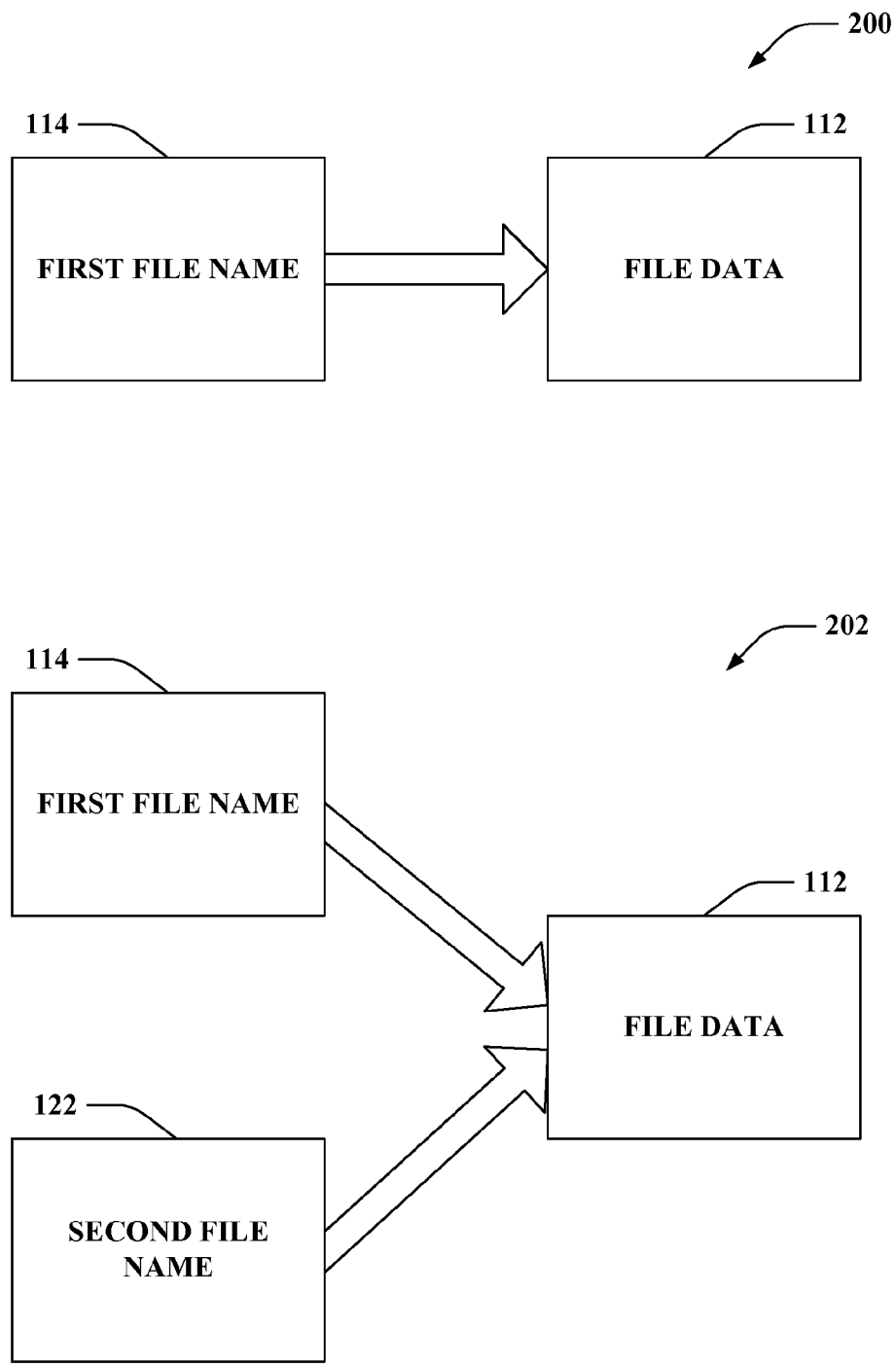
FIG. 2 illustrates an exemplary diagram depicting use of hard links in response to a copy command received during file installation or removal.

Now referring to FIG. 2, illustrated is an exemplary diagram depicting use of hard links in response to a copy command received during file installation or removal. As shown, the hard links can be utilized to simulate conventional copying of a file. A file can include two components: a file name and file data. The file name is a hard link to the file data (e.g., the file name is a pointer to the file data). Thus, a file (e.g., the file name and the file data) can initially be retained in a data store. Turning to the illustrated example, at 200 and as discussed above, the file data 112 can be retained at a first location in a data store (e.g., the data store 106 of FIG. 1) and the first file name 114 can be retained at a second location in the data store, where the first file name 114 is a hard link to the file data 112.

Thereafter, a copy command can be received. As shown at 202, the second file name 122 is created in response to the copy command. The second file name 122 is a hard link to the file data 112. The second file name 122 is created while the file data 112 is immutably maintained at the first location in the data store. Thus, the file data 112 retained at the first location in the data store is maintained without being copied in response to the copy command. Hence, the file data 112 need not be duplicated in response to the copy command. Further, the first file name 114 retained at the second location in the data store can be maintained in response to the copy command (e.g., the first file name 114 can continue to point to the file data 112 in response to the copy command). In contrast, when a file is conventionally copied, file data is typically duplicated. For instance, the file data 112 would commonly be duplicated to create new file data (e.g., a new block of data) when performing a conventional file copy.

Use of hard links to simulate copying a file as described herein can utilize significantly less computational overhead compared to conventional file copying. A hard link consumes very little disk space and creation of the hard link is quick when compared to space and time considerations associated with copying contents of a file (e.g., the file data 112). Also, the time and space to create a hard link to the file data 112 are independent of the size of the file. In contrast, conventional file copying is more computationally expensive with larger files. Further, the computational costs can remain constant since a hard link is created to existing data (e.g., the file data 112) instead of duplicating source file data, thereby mitigating computational costs of duplicating the data.

Figure 3:
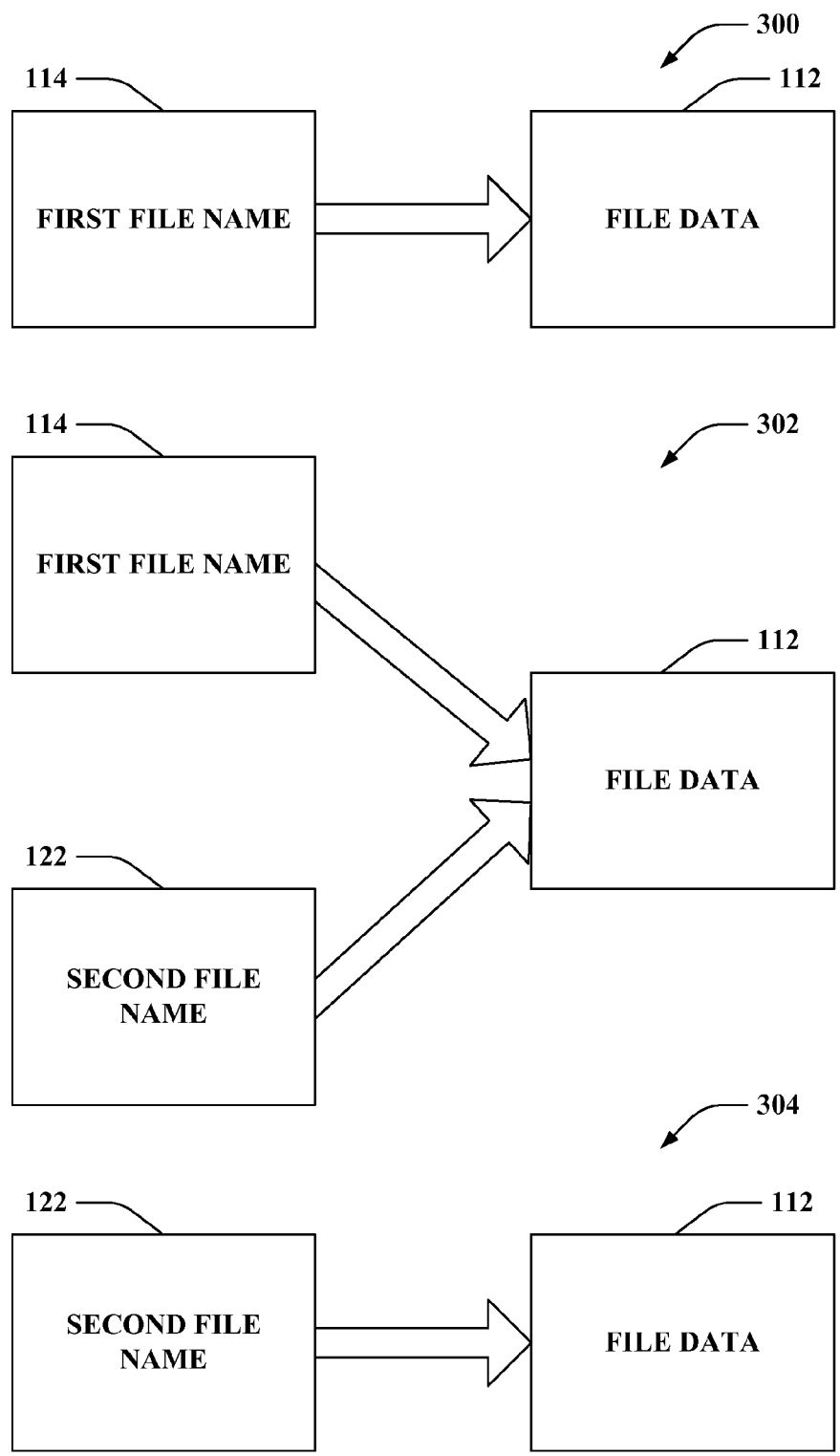
FIG. 3 illustrates an exemplary diagram depicting use of hard links in response to a move command received during file installation or removal.

Turning to FIG. 3, illustrated is an exemplary diagram depicting use of hard links in response to a copy command received during file installation. As depicted, the hard links can be employed to simulate conventional moving of a file. Similar to FIG. 2, at 300, the file data 112 can be retained at a first location in a data store (e.g., the data store 106 of FIG. 1) and the first file name 114 can be retained at a second location in the data store, where the first file name 114 is a hard link to the file data 112. Thereafter, a move command can be received. As shown at 302, the second file name 122 is created in response to the move command, where the second file name 122 is a hard link to the file data 112. The second file name 122 is created while the file data 112 is immutably maintained at the first location in the data store. Accordingly, the file data 112 retained at the first location in the data store is maintained without being moved in response to the move command. Thereafter, at 304, the first file name 114 retained at the second location in the data store is deleted in response to the move command.

Thus, as shown in FIG. 3, a new pointer (e.g., the second file name 122, destination, etc.) can be created, and then an original pointer (e.g., the first file name 114, source, etc.) is deleted in response to the move command. The foregoing can be performed while keeping the file data 112 locked. According to an example, if the first file name 114 cannot be deleted upon creating the second file name 122 that points to the file data 112 (e.g., as shown at 302), then the first file name 114 can be deleted at a later time (e.g., when installation terminates, when the file data 112 is unlocked, etc.).

Use of hard links to simulate moving a file as set forth herein can significantly decrease computational overhead compared to conventional file moving. While conventional file moves on the same file system volume (e.g., New Technology File System (NTFS) volume) may conventionally be efficient, a file typically is unlocked before a conventional file move. A file (e.g., source file) is typically unlocked (e.g., the file is made modifiable again), moved (e.g., which can be fast and efficient), and then the destination file commonly is locked and verified again, which can be computationally costly. In contrast, by using hard links, the second file name 122 (e.g., a new hard link, a new pointer, etc.) to the file data 112 is created, and then the first file name 114 (e.g., an original hard link, original pointer, etc.) is deleted. For instance, deletion of the first file name 114 can be deferred until a later time (e.g., when the installation terminates, when the file data 112 is subsequently unlocked, etc.). Accordingly, the second file name 122 can be created and the first file name 114 can be deleted (e.g., simulating a conventional file move) while the file data 112 remains locked. Hence, computational costs associated with locking and verifying a destination file when employing a conventional file move can be avoided by using hard links as described herein.

Figure 4:
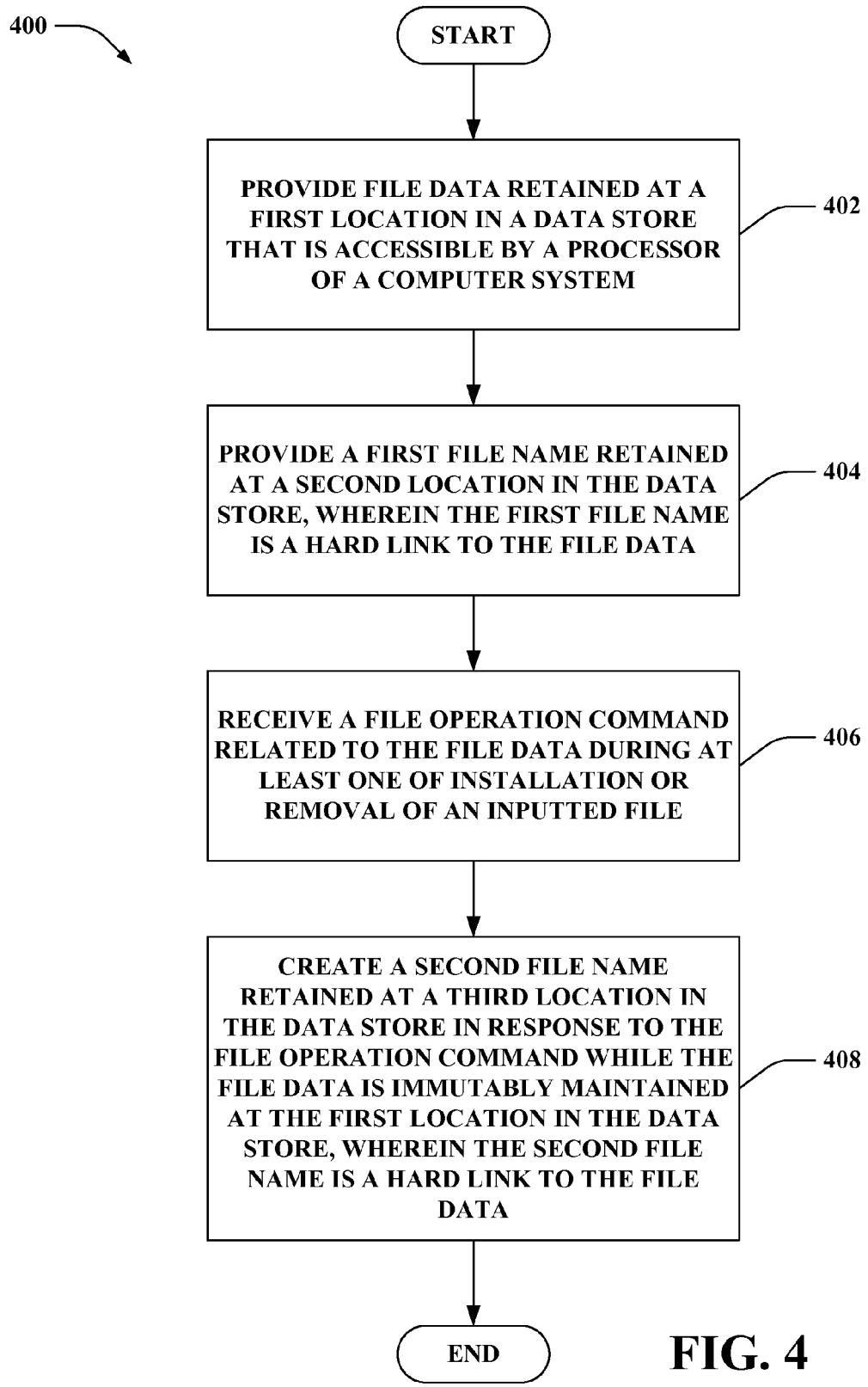
FIG. 4 is a flow diagram that illustrates an exemplary methodology for performing a file operation on an inputted file on a computer system.
Figure 5:
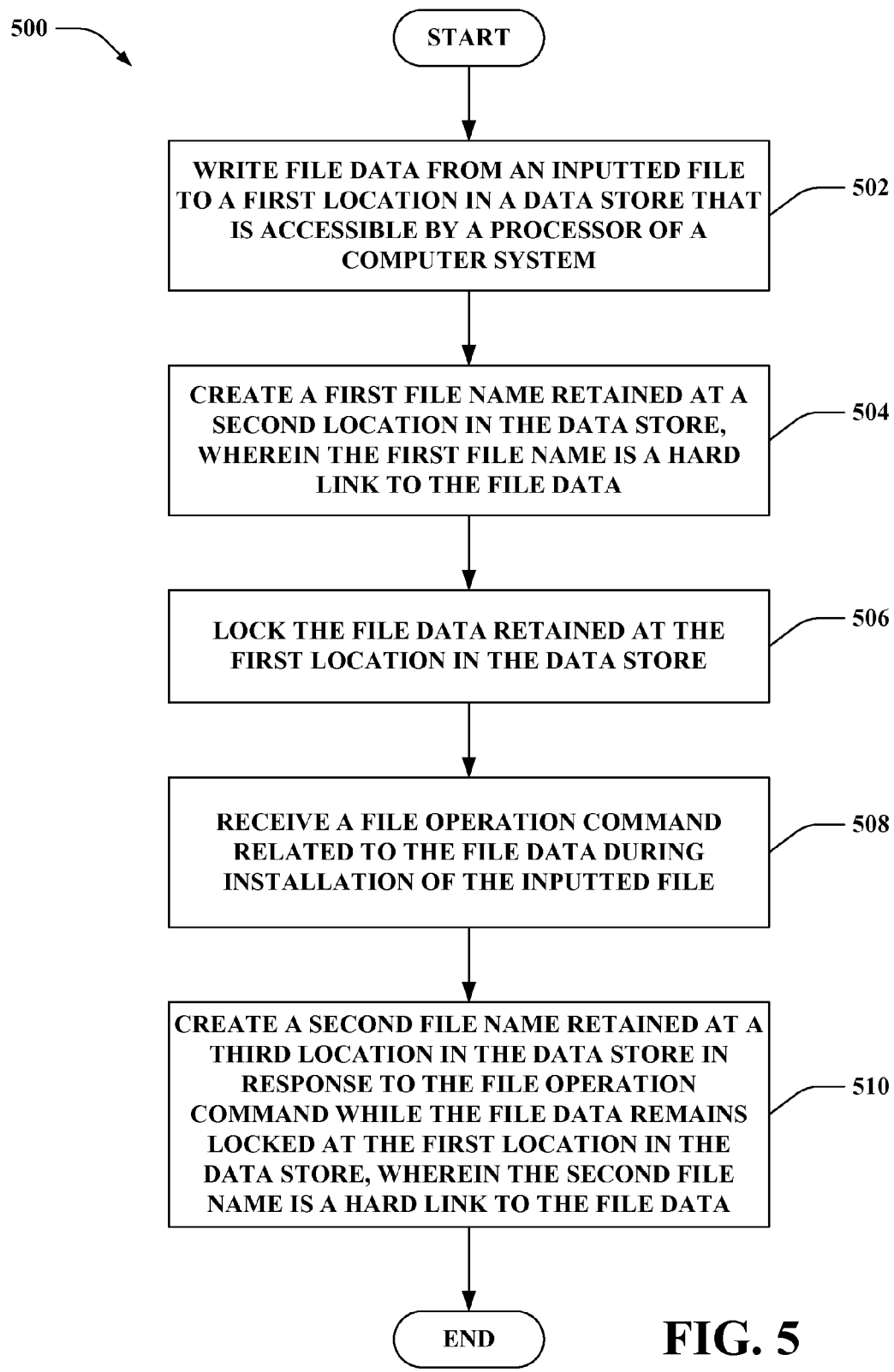
FIG. 5 is a flow diagram that illustrates an exemplary methodology for installing an inputted file on a computer system.

FIGS. 4-5 illustrate exemplary methodologies relating performing file operations using hard links while file data remains immutable. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 4 illustrates a methodology 400 for performing a file operation on an inputted file on a computer system. At 402, file data retained at a first location in a data store that is accessible by a processor of a computer system can be provided. For instance, an inputted file can include the file data. Moreover, the file data can be written from the inputted file to the first location in the data store. At 404, a first file name retained at a second location in the data store can be provided. The first file name is a hard link to the file data. A hard link can be a directory entry for file data on a file system; thus, the first file name can be a directory entry for the file data.

At 406, a file operation command related to the file data can be received during at least one of installation or removal of the inputted file. The file operation command, for instance, can be a copy command, a move command, or the like. At 408, a second file name retained at a third location in the data store can be created in response to the file operation command while the file data is immutably maintained at the first location in the data store. Further, the second file name is a hard link to the file data. Thus, the second file name can be a directory entry for the file data. According to an example, if the file operation command is a move command, then the first file name retained at the second location in the data store can be deleted in response to the move command (e.g., after the second file name is created, etc.). By way of another example, if the file operation command is a copy command, then the first file name retained at the second location in the data store can be maintained in response to the copy command.

Turning to FIG. 5, illustrated is a methodology 500 for installing an inputted file on a computer system. At 502, file data from an inputted file can be written to a first location in a data store that is accessible by a processor of a computer system. At 504, a first file name retained at a second location in the data store can be created. The first file name is a hard link to the file data. At 506, the file data retained at the first location in the data store is locked. When locked, the file data is immutable. At 508, a file operation command related to the file data can be received during installation of the inputted file. At 510, a second file name retained at a third location in the data store can be created in response to the file operation command while the file data remains located at the first location in the data store. Moreover, the second file name is a hard link to the file data.

Figure 6:
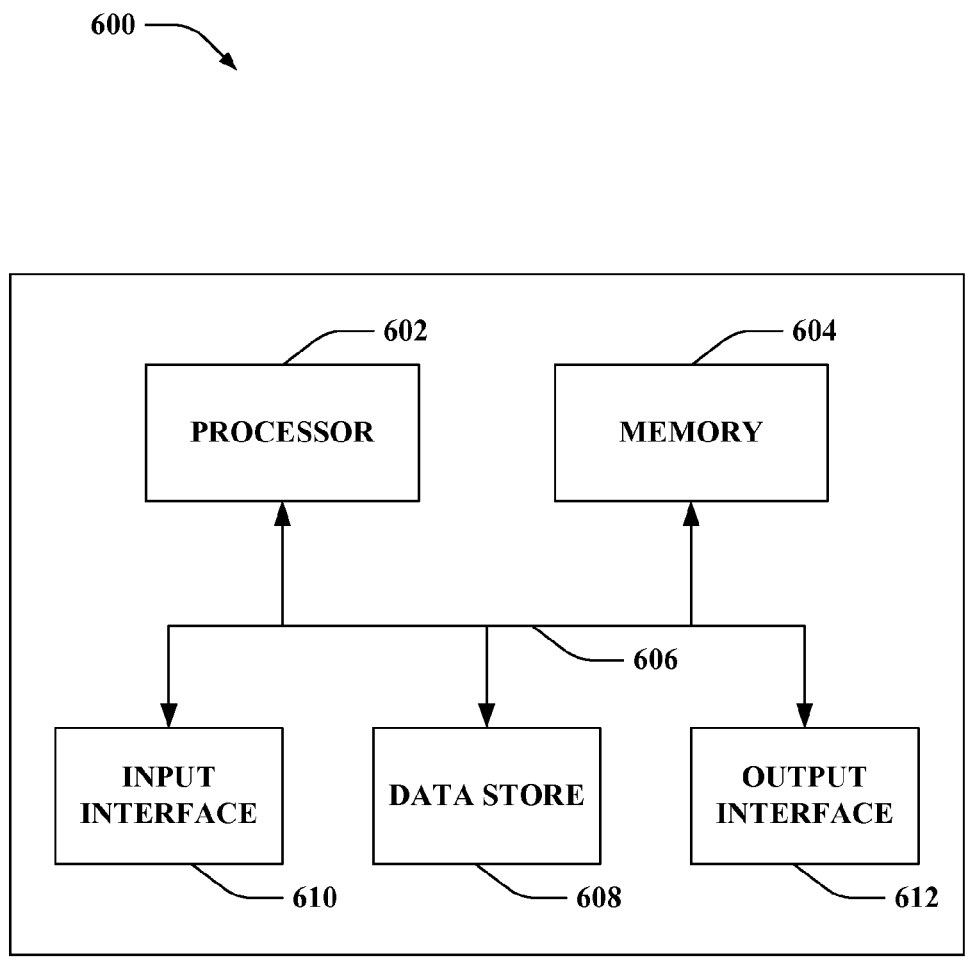
FIG. 6 illustrates an exemplary computing device.

Referring now to FIG. 6, a high-level illustration of an exemplary computing device 600 that can be used in accordance with the systems and methodologies disclosed herein is illustrated. For instance, the computing device 600 may be used in a system that uses hard links to perform file operations during file installation or removal. The computing device 600 includes at least one processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store file data, file names, verification result information, and so forth.

The computing device 600 additionally includes a data store 608 that is accessible by the processor 602 by way of the system bus 606. The data store 608 may include executable instructions, file data, file names, verification result information, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

Additionally, while illustrated as a single system, it is to be understood that the computing device 600 may be a distributed system. Thus, for instance, several devices may be in communication by way of a network connection and may collectively perform tasks described as being performed by the computing device 600.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of performing a file operation on an inputted file on a computer system, comprising:
   providing file data retained at a first location in a data store that is accessible by a processor of the computer system, wherein the inputted file includes the file data;
   providing a first file name retained at a second location in the data store, wherein the first file name is a hard link to the file data;
   as part of one of installation or removal of the inputted file, causing the file data to continuously be locked at the first location in the data store until termination of the installation or the removal of the inputted file, wherein the file data is immutably maintained at the first location in the data store while locked; and
   while the file data is continuously locked at the first location in the data store during the installation or the removal of the inputted file;
     receiving a file operation command related to the file data;
     creating a second file name retained at a third location in the data store in response to the file operation command, wherein the second file name is a hard link to the file data;
     subsequent to creation of the second file name in response to the file operation command, receiving a request to verify the file data to detect presence or absence of an error; and
     responsive to receiving the request to verify the file data and so long as the file data remains immutably maintained, returning verification result information that is cached, the verification result information being from prior verification of the file data, and the verification result information being returned responsive to the request without reverifying the file data.

2. The method of claim 1, wherein the file operation command is a copy command, the method further comprising:
   maintaining the file data retained at the first location in the data store without copying the file data retained at the first location in the data store in response to the copy command;
   maintaining the first file name retained at the second location in the data store in response to the copy command; and
   creating the second file name retained at the third location in the data store in response to the copy command.

3. The method of claim 1, wherein the file operation command is a move command, the method further comprising:
   maintaining the file data retained at the first location in the data store without moving the file data retained at the first location in the data store in response to the move command;
   creating the second file name retained at the third location in the data store in response to the move command; and
   deleting the first file name retained at the second location in the data store in response to the move command.

4. The method of claim 1, wherein the file data is immutably maintained at the first location in the data store without being moved and without being copied when the second file name retained at the third location in the data store is created in response to the file operation command.

5. The method of claim 1, further comprising:
   writing the file data from the inputted file to the first location in the data store;
   creating the first file name retained at the second location in the data store; and
   subsequent to the file data from the inputted file being written to the first location in the data store and prior to the creation of the second file name retained at the third location in the data store in response to the file operation command, verifying the file data as locked at the first location in the data store to generate the verification result information.

6. The method of claim 5, further comprising, responsive to writing the file data to the first location in the data store, verifying the file data at the first location in the data store by at least one of calculating a hash value based on the file data or checking a digital signature of the file data.

7. The method of claim 5, further comprising caching the verification result information generated from verifying the file data at the first location in the data store while the file data remains locked, the file data being verified to generate the verification result information responsive to writing the file data to the first location in the data store.

8. The method of claim 5, further comprising:
creating the first file name retained at the second location in the data store, wherein the second location in the data store is a temporary location;
generating a request for elevated access to resources;
receiving a response that grants the elevated access to the resources; and
creating the second file name retained at the third location in the data store based on receiving the response that grants the elevated access to the resources, wherein the third location in the data store is a restricted location.

9. The method of claim 1, further comprising:
receiving a disparate file operation command related to the file data, wherein the disparate file operation command is a delete command;
deferring deletion of at least one of the first file name retained at the second location in the data store or the second file name retained at the third location in the data store for a deferral period of time in response to the disparate file operation command; and
deleting the at least one of the first file name retained at the second location in the data store or the second file name retained at the third location in the data store in response to the disparate file operation command after the deferral period of time.

10. The method of claim 1, further comprising rolling back the file operation command by deleting the second file name retained at the third location in the data store.

11. The method of claim 10, further comprising rolling back the file operation command and a disparate file operation command in parallel as an atomic transaction.

12. The method of claim 1, further comprising at least one of:
installing the file data and disparate file data in parallel as an atomic transaction;
committing the file data and the disparate file data in parallel as an atomic transaction; or rolling back the file data and the disparate file data in parallel as an atomic transaction.

13. The method of claim 1, wherein a hard link is a directory entry for file data on a file system.

14. A system that performs a file operation on an inputted file on a computer system, comprising:
a data store;
at least one processor; and
memory that comprises computer-executable instructions that, when executed by the at least one processor, cause the at least one processor to perform acts including:
writing file data from the inputted file to a first location in the data store;
creating a first file name that points to the file data, wherein the first file name is a hard link to the file data and is retained in a second location in the data store;
subsequent to the file data being written to the first location in the data store and as part of one of installation or removal of the inputted file, causing the file data retained at the first location in the data store to be continuously locked until termination of the installation or the removal of the inputted file, wherein the file data is immutable when locked; and
while the file data is continuously locked at the first location in the data store during the installation or the removal of the inputted file:
verifying the file data as locked at the first location in the data store, wherein the file data as locked at the first location in the data store is verified by detecting presence or absence of an error in the file data;
receiving a file operation command related to the file data; and
performing the file operation command while the file data remains locked during the installation or the removal of the inputted file, wherein the file operation command is one of a move command or a copy command.

15. The system of claim 14, the memory further comprising computer-executable instructions that, when executed by the at least one processor, cause the at least one processor to perform acts including:
creating a second file name retained at a third location in the data store in response to the file operation command while the file data remains locked.

16. The system of claim 14, the memory further comprising computer-executable instructions that, when executed by the at least one processor, cause the at least one processor to perform acts including:
deleting the first file name retained at the second location in the data store in response to the file operation command.

17. The system of claim 14, the memory further comprising computer-executable instructions that, when executed by the at least one processor, cause the at least one processor to perform acts including:
caching verification result information generated from verifying the file data as locked at the first location in the data store while the file data remains locked;
receiving a request to verify the file data subsequent to caching the verification result information and prior to the termination of the installation or the removal of the inputted file; and
responsive to receiving the request to verify the file data, returning the verification result information as cached without reverifying the file data.

18. The system of claim 14, wherein a hard link is a directory entry for file data on a file system.

19. A computer-readable storage medium including computer-executable instructions that, when executed by a processor, cause the processor to perform acts including:
writing file data from an inputted file to a first location in a data store;
creating a first file name retained at a second location in the data store, wherein the first file name is a hard link to the file data;
subsequent to the file data being written to the first location in the data store and as part of installation of the inputted file, causing the file data retained at the first location in the data store to be continuously locked until termination of the installation of the inputted file; and while the file data is continuously locked at the first location in the data store during the installation of the inputted file:
  verifying the file data as locked at the first location in the data store by detecting presence or absence of an error in the file data;
  caching verification result information generated from the verifying of the file data, the verification result information being cached so long as the file data remains locked and discarded when the file data is unlocked;
  receiving a file operation command related to the file data during the installation of the inputted file; and
  creating a second file name retained at a third location in the data store in response to the file operation command while the file data remains locked at the first location in the data store, wherein the second file name is a hard link to the file data.

20. The computer-readable storage medium of claim 19, further including computer-executable instructions that, when executed by the processor, cause the processor to perform acts including:
  subsequent to creation of the second file name in response to the file operation command, receiving a request to verify the file data to detect the presence or the absence of the error; and
  responsive to receiving the request to verify the file data and so long as the file data remains locked, returning the verification result information that is cached, the verification result information being returned responsive to the request without reverifying the file data.

* * * * *